(12) United States Patent
Zhang et al.

(10) Patent No.: US 12,525,196 B2
(45) Date of Patent: Jan. 13, 2026

(54) DISPLAY DEVICE, GATE DRIVING CIRCUIT, SHIFT REGISTER UNIT AND DRIVING METHOD THEREOF

(71) Applicants: Chengdu BOE Optoelectronics Technology Co., Ltd., Sichuan (CN); BOE Technology Group Co., Ltd., Beijing (CN)

(72) Inventors: Jingwen Zhang, Beijing (CN); Yonglin Guo, Beijing (CN); Dan Cao, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/685,700

(22) PCT Filed: Feb. 27, 2023

(86) PCT No.: PCT/CN2023/078439
§ 371 (c)(1),
(2) Date: Feb. 22, 2024

(87) PCT Pub. No.: WO2024/066190
PCT Pub. Date: Apr. 4, 2024

(65) Prior Publication Data
US 2025/0225937 A1    Jul. 10, 2025

(30) Foreign Application Priority Data
Sep. 27, 2022   (CN) .......................... 202211185413.2

(51) Int. Cl.
G09G 3/3266   (2016.01)
G11C 19/28    (2006.01)

(52) U.S. Cl.
CPC .......... *G09G 3/3266* (2013.01); *G11C 19/28* (2013.01); *G09G 2310/0286* (2013.01); *G09G 2310/08* (2013.01)

(58) Field of Classification Search
None
See application file for complete search history.

(56) References Cited

U.S. PATENT DOCUMENTS

2020/0066209 A1* 2/2020 Zhang .................... G11C 19/28

FOREIGN PATENT DOCUMENTS

| CN | 107154234 A | 9/2017 |
|----|-------------|--------|
| CN | 109616056 A | 4/2019 |

(Continued)

OTHER PUBLICATIONS

PCT/CN2023/078439 international search report dated Apr. 28, 2023.
PCT/CN2023/078439 Written Opinion dated Apr. 28, 2023.

*Primary Examiner* — Christopher J Kohlman
(74) *Attorney, Agent, or Firm* — IPro, PLLC

(57) ABSTRACT

The present disclosure provides a display device, a gate driving circuit, a shift register unit and a driving method thereof. The shift register unit includes an input subcircuit, a first control subcircuit, a second control subcircuit, a third control subcircuit and an output subcircuit. The third control subcircuit is connected to the first node, the second clock signal terminal and the fifth node, and is configured to control a potential of the fifth node according to potentials of the first node and the second clock signal terminal.

18 Claims, 9 Drawing Sheets

(56) References Cited

FOREIGN PATENT DOCUMENTS

| | | |
|---|---|---|
| CN | 113362768 A | 9/2021 |
| CN | 113724770 A | 11/2021 |
| CN | 117831594 A | 4/2024 |

* cited by examiner

DISPLAY DEVICE, GATE DRIVING CIRCUIT, SHIFT REGISTER UNIT AND DRIVING METHOD THEREOF

CROSS-REFERENCE TO RELATED APPLICATIONS

This application is a national stage of international PCT Application No. PCT/CN2023/078439, filed on Feb. 27, 2023. International PCT Application No. PCT/CN2023/078439 claims priority to Chinese Patent Application No. 202211185413.2 filed on Sep. 27, 2022. The entire contents of each of the above-listed applications are hereby incorporated by reference for all purposes.

TECHNICAL FIELD

The present disclosure relates to the field of display technology, and in particular, to a display device, a gate driving circuit, a shift register unit and a driving method thereof.

BACKGROUND

The gate driving circuit is an important auxiliary circuit in Active Matrix Organic Light-Emitting Diode (AMOLED) display. Existing gate driving circuits include a plurality of cascaded shift register units. However, such gate driving circuit still needs improvement.

SUMMARY

The objective of the present disclosure is to provide a display device, a gate driving circuit, a shift register unit and a driving method thereof.

According to one aspect of the present disclosure, there is provided a shift register unit, including:
- an input subcircuit connected to a signal input terminal, a first clock signal terminal and a first node, and configured to control connection between the signal input terminal and the first node under control of a potential of the first clock signal terminal;
- a first control subcircuit connected to a first power supply signal terminal, the first clock signal terminal, the first node and a second node, configured to control connection between the first clock signal terminal and the second node under control of a potential of the first node, and further configured to control connection between the first power supply signal terminal and the second node under control of a potential of the first clock signal terminal;
- a second control subcircuits connected to the second node, a third node, a fourth node and a second clock signal terminal, configured to control connection between the second clock signal terminal and the third node under control of a potential of the second node, and further configured to control connection between the third node and the fourth node under control of a potential of the second clock signal terminal;
- a third control subcircuit connected to the first node, the second clock signal terminal and a fifth node, and configured to control a potential of the fifth node according to potentials of the first node and the second clock signal terminal;
- an output subcircuit connected to the first power supply signal terminal, a second power supply signal terminal, the fourth node, the fifth node and a signal output terminal, configured to control connection between the second power supply signal terminal and the signal output terminal under control of a potential of the fourth node, and further configured to control connection between the first power supply signal terminal and the signal output terminal under control of a potential of the fifth node.

Further, the third control subcircuit is connected to the first node, the second clock signal terminal, the fifth node and the sixth node, configured to control connection between the first node and the sixth node under control of a potential of the second clock signal terminal, and further configured to control connection between the first node and the fifth node under control of a potential of the sixth node.

Further, the third control subcircuit includes:
- a first transistor having a control electrode connected to the second clock signal terminal, a first electrode connected to the first node, and a second electrode connected to the sixth node;
- a second transistor having a control electrode connected to the sixth node, a first electrode connected to the first node, and a second electrode connected to the fifth node.

Further, the shift register unit further includes a fourth control subcircuit; wherein the fourth control subcircuit includes a third transistor, a fourth transistor and a first capacitor, the third transistor has a control electrode connected to the second node, a first electrode connected to the second power supply signal terminal, and a second electrode connected to the seventh node; the fourth transistor has a control electrode connected to the first node, a first electrode connected to the second clock signal terminal, and a second electrode connected to the seventh node; the first capacitor is connected between the first node and the seventh node.

Further, the shift register unit further includes a fourth control subcircuit; wherein the fourth control subcircuit includes a fourth transistor and a first capacitor, the fourth transistor has a control electrode connected to the first node, a first electrode connected to the second clock signal terminal, and a second electrode connected to the seventh node; the first capacitor is connected between the first node and the seventh node.

Further, the shift register unit further includes:
- a fifth control subcircuit connected to the fourth node, the fifth node, an eighth node, the first power supply signal terminal and the second power supply signal terminal, and configured to control connection between the fifth node and the eighth node under control of a potential of the first power supply signal terminal, and further configured to control connection between the second power supply signal terminal and the eighth node under control of a potential of the fourth node.

Further, the fifth control subcircuit includes:
- a sixteenth transistor having a control electrode connected to the fourth node, a first electrode connected to the second power supply signal terminal, and a second electrode connected to the eighth node;
- a seventeenth transistor having a control electrode connected to the first power supply signal terminal, a first electrode connected to the eighth node, and a second electrode connected to the fifth node.

Further, the input subcircuit includes:
- a fifth transistor having a control electrode connected to the first clock signal terminal, a first electrode connected to the signal input terminal, and a second electrode connected to the first node.

Further, the first control subcircuit includes:

a sixth transistor having a control electrode connected to the first clock signal terminal, a first electrode connected to the first power supply signal terminal, and a second electrode connected to the second node;
a seventh transistor having a control electrode connected to the first node, a first electrode connected to the first clock signal terminal, and a second electrode connected to the second node.

Further, the output subcircuit includes:
an eighth transistor having a control electrode connected to the fourth node, a first electrode connected to the second power supply signal terminal, and a second electrode connected to the signal output terminal;
a ninth transistor having a control electrode connected to the fifth node, a first electrode connected to the first power supply signal terminal, and a second electrode connected to the signal output terminal;
a second capacitor connected between the fourth node and the second power supply signal terminal.

Further, the second control subcircuit includes:
a tenth transistor having a control electrode connected to the second node, a first electrode connected to the second clock signal terminal, and a second electrode connected to the third node;
an eleventh transistor having a control electrode connected to the second clock signal terminal. a first electrode connected to the third node, and a second electrode connected to the fourth node;
a third capacitor connected between the second node and the third node.

Further, the shift register unit further includes:
a pull-up subcircuit connected to the fifth node, the second power supply signal terminal and the fourth node, and configured to control connection between the second power supply signal terminal and the fourth node under control of a potential of the fifth node; or the pull-up subcircuit being connected to the first node, the second power supply signal terminal and the fourth node, and configured to control connection between the second power supply signal terminal and the fourth node under control of a potential of the first node.

Further, the shift register unit further includes:
a pull-up subcircuit connected to the first node, the second power supply signal terminal and the fourth node, and configured to control connection between the second power supply signal terminal and the fourth node under control of a potential of the first node.

Further, the shift register unit further includes:
a voltage stabilizing subcircuit connected to the fifth node.

Further, the voltage stabilizing subcircuit includes:
a voltage stabilizing capacitor connected between the fifth node and the signal output terminal.

Further, the shift register unit further includes:
an anti-flash screen subcircuit, connected to the first node, the fifth node, the second power supply signal terminal and the control signal terminal, configured to control connection between the first node and the second power supply signal terminal under control of a potential of the control signal terminal, and further configured to control connection between the fifth node and the second power supply signal terminal under control of a potential of the control signal terminal.

According to one aspect of the present disclosure, there is provided a gate driving circuit, including a plurality of cascaded shift register units described above.

According to one aspect of the present disclosure, there is provided a display device, including the gate driving circuit described above.

According to one aspect of the present disclosure, there is provided a driving method for a shift register unit, wherein the driving method is applied to the shift register unit described above, and the driving method includes:
causing the input subcircuit to control connection between the signal input terminal and the first node under control of a potential of the first clock signal terminal;
causing the first control subcircuit to control connection between the first clock signal terminal and the second node under control of a potential of the first node, and further causing the first control subcircuit to control connection between the first power supply signal terminal and the second node under control of a potential of the first clock signal terminal;
causing the second control subcircuit to control connection between the second clock signal terminal and the third node under control of a potential of the second node, and further causing the second control subcircuit to control connection between the third node and the fourth node under control of a potential of the second clock signal terminal;
causing the third control subcircuit to control a potential of the fifth node according to potentials of the first node and the second clock signal terminal;
causing the output subcircuit to control connection between the second power supply signal terminal and the signal output terminal under control of a potential of the fourth node, and further causing the output subcircuit to control connection between the first power supply signal terminal and the signal output terminal under control of a potential of the fifth node.

In the display device, the gate driving circuit, the shift register unit and the driving method thereof of the present disclosure, when the input subcircuit controls connection between the signal input terminal and the first node under the control of the potential of the first clock signal terminal, the third control subcircuit controls the first node to be disconnected from the fifth node according to the potential of the second clock signal terminal, to prevent the potential of the signal input terminal from being directly written into the fifth node, thereby avoiding the step phenomenon. When the input subcircuit controls the control signal input terminal to be disconnected from the first node under the control of the potential of the first clock signal terminal, the third control subcircuit controls the first node to be connected to the fifth node according to the potential of the second clock signal terminal, so that the signal output terminal outputs normally.

Figure 1:
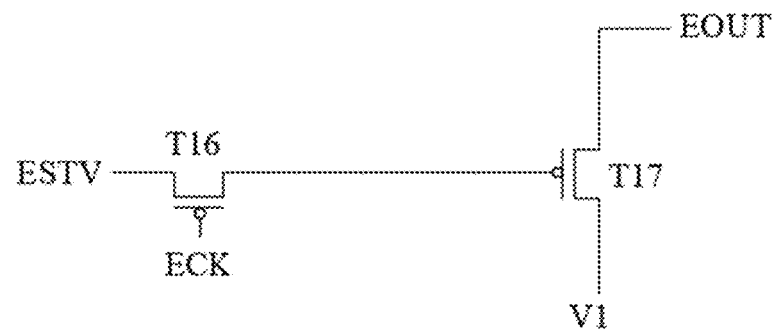
FIG. 1 is a circuit diagram of a shift register unit in the related art.

Description of reference signs: ESTV: Signal Input Terminal; ECK: First Clock Signal Terminal; ECB: Second Clock Signal Terminal; V1: First Power supply signal terminal; V2: Second Power supply signal terminal; EOUT: Signal Output Terminal; ECX: Control Signal Terminal; C1: First Capacitor; C2: Second Capacitor; C3: Third Capacitor; C4: Voltage Stabilizing Capacitor; N1: First Node; N2: Second Node; N3: Third Node; N4: Fourth Node; N5: Fifth Node; N6: Sixth Node; N7: Seventh Node; T1: First Transistor; T2: Second Transistor; T3: Third Transistor; T4: Fourth Transistor; T5: Fifth Transistor; T6: Sixth Transistor; T7: Seventh Transistor; T8: Eighth Transistor; T9: Ninth Transistor; T10: Tenth Transistor; T11: Eleventh Transistor; T12: Twelfth Transistor; T13: Thirteenth Transistor; T14: Fourteenth Transistor; T15: Fifteenth Transistor; T16: Input Transistor; T17: Output Transistor; T18: Sixteenth Transistor; T19: Seventeenth Transistor; T20: Eighteenth Transistor; T21: Nineteenth Transistor; 1: Input Subcircuit; 2: First Control Subcircuit; 3: Second Control Subcircuit; 4: Third Control Subcircuit; 5: Output Subcircuit; 6: Fourth Control Subcircuit; 7: Pull-Up Subcircuit; 8: Voltage Stabilizing Subcircuit; 9: Anti-Flash Screen Subcircuit; 10: Fifth Control Subcircuit.

DETAILED DESCRIPTION OF THE EMBODIMENTS

Exemplary embodiments will be described in detail herein, with the illustrations thereof represented in the drawings. When the following descriptions involve the drawings, like numerals in different drawings refer to like or similar elements unless otherwise indicated. The embodiments described in the following exemplary embodiments do not represent all embodiments consistent with the present disclosure. Rather, they are merely examples of apparatuses and methods consistent with some aspects of the present disclosure as detailed in the appended claims.

The terms used in the present disclosure are for the purpose of describing particular exemplary embodiments only, and are not intended to limit the present disclosure. Unless otherwise defined, technical terms or scientific terms used in the present disclosure shall have the usual meaning understood by those ordinarily skilled in the art to which the present disclosure belongs. The "first", "second" and similar words used in the description and the claims of the present disclosure do not indicate any order, quantity or importance, but are only used to distinguish different components. Likewise, "a" or "one" and similar words do not indicate a quantitative limit, but rather indicate the presence of at least one. "Multiple" or "several" means two or more than two. "Including" or "comprising" and other similar words mean that the elements or objects appearing before "including" or "comprising" cover elements or objects listed after "including" or "comprising" and their equivalents, and do not exclude other elements or objects. Words such as "connected to" or "connected with" are not limited to physical or mechanical connections, but can include electrical connections, whether direct or indirect. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

The transistors used in the present disclosure can be triodes, thin film transistors, field effect transistors, or other devices with the same characteristics. In the embodiments of the present disclosure, in order to distinguish the two electrodes of the transistor except the control electrode, one electrode is referred to as a first electrode and the other electrode is referred to as a second electrode.

In actual operation, when the transistor is a triode, the control electrode can be a base electrode, the first electrode can be a collector electrode, and the second electrode can be an emitter electrode; or, the control electrode can be a base electrode, the first electrode can be an emitter electrode, and the second electrode can be a collector electrode.

In actual operation, when the transistor is a thin film transistor or a field effect transistor, the control electrode can be a gate electrode, the first electrode can be a drain electrode, and the second electrode can be a source electrode. Alternatively, the control electrode can be a gate electrode, the first electrode can be a source electrode, and the second electrode can be a drain electrode.

In the related art, as shown in FIG. 1, the shift register unit includes an input transistor T16 and an output transistor T17. A control electrode of the input transistor T16 is connected to a first clock signal terminal ECK, and a first electrode of the input transistor T16 is connected to a signal input terminal ESTV. A control electrode of the output transistor T17 is connected to a second electrode of the input transistor T16, a first electrode of the output transistor T17 is connected to a first power supply signal terminal V1, and a second electrode of the output transistor T17 is connected to a signal output terminal EOUT. During the operation process, when the signal input terminal ESTV and the first clock signal terminal ECK are both at low level, the signal output from the input transistor T16 will be directly written into the control electrode of the output transistor T17, causing the potential of the control electrode of the output transistor T17 to be unable to decrease to a lower potential than the potential of the first power supply signal terminal V1, which causes the output signal of the signal output terminal EOUT to form a step. In addition, during the process of the shift register unit outputting an effective level, the potential of the control electrode of the output transistor T17 will change, causing the output of the output transistor T17 to be a floating voltage during half of the time period. During the time period when the output transistor T17 outputs a floating voltage, the output of the output transistor T17 is easily disturbed.

Figure 2A:
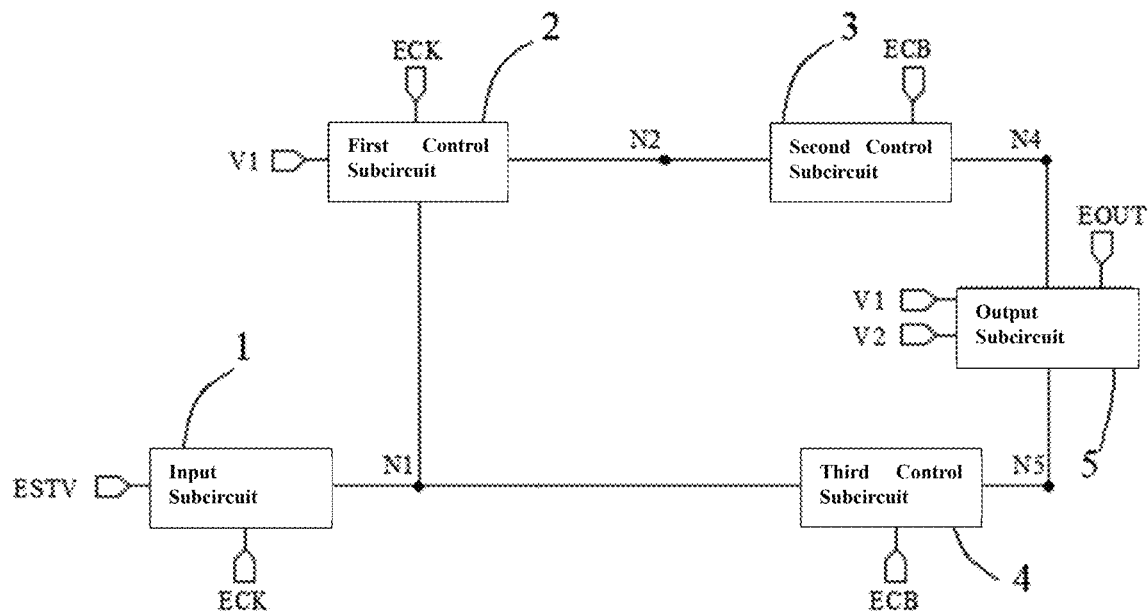
FIG. 2(a), FIG. 2(b), FIG. 2(c), FIG. 2(d), FIG. 2(e) and FIG. 2(f) are block diagrams of a shift register unit according to an embodiment of the present disclosure.

In order to solve the above problem, embodiments of the present disclosure provide a shift register unit. As shown in FIG. 2(a), the shift register unit can include an input subcircuit 1, a first control subcircuit 2, a second control subcircuit 3, a third control subcircuit 4 and an output subcircuit 5.

The input subcircuit 1 is connected to a signal input terminal ESTV, a first clock signal terminal ECK and a first node N1, and is configured to control connection between the signal input terminal ESTV and the first node N1 under the control of the potential of the first clock signal terminal ECK. The first control subcircuit 2 is connected to a first power supply signal terminal V1, the first clock signal terminal ECK, the first node N1 and a second node N2, and is configured to control connection between the first clock signal terminal ECK and the second node N2 under the control of the potential of the first node N1, and is also configured to control connection between the first power supply signal terminal V1 and the second node N2 under the control of the potential of the first clock signal terminal ECK. The second control subcircuit 3 is connected to the second node N2, a third node N3, a fourth node N4 and a second clock signal terminal ECB, and is configured to control connection between the second clock signal terminal ECB and the third node N3 under the control of the potential of the second node N2, and is also configured to control connection between the third node N3 and the fourth node N4 under the control of the potential of the second clock signal terminal ECB. The third control subcircuit 4 is connected to the first node N1, the second clock signal terminal ECB and a fifth node N5, and is configured to control the potential of the fifth node N5 according to the potentials of the first node N1 and the second clock signal terminal ECB. The output subcircuit 5 is connected to the first power supply signal terminal V1, a second power supply signal terminal V2, the fourth node N4, the fifth node N5 and a signal output terminal EOUT, and is configured to control connection between the second power supply signal terminal V2 and the signal output terminal EOUT under the control of the potential of the fourth node N4, and is also configured to control connection between the first power supply signal terminal V1 and the signal output terminal EOUT under the control of the potential of the fifth node N5.

In the shift register unit of the embodiment of the present disclosure, when the input subcircuit 1 controls connection between the signal input terminal ESTV and the first node N1 under the control of the potential of the first clock signal terminal ECK, the third control subcircuit 4 controls the first node N1 to be disconnected from the fifth node N5 according to the potential of the second clock signal terminal ECB, to prevent the potential of the signal input terminal ESTV from being directly written into the fifth node N5, thereby avoiding the step phenomenon. When the input subcircuit 1 controls the control signal input terminal ESTV to be disconnected from the first node N1 under the control of the potential of the first clock signal terminal ECK, the third control subcircuit 4 controls the first node N1 to be connected to the fifth node N5 according to the potential of the second clock signal terminal ECB, so that the signal output terminal EOUT outputs normally.

Every part of the shift register unit in the embodiment of the present disclosure will be described in detail below.

Figure 3A:
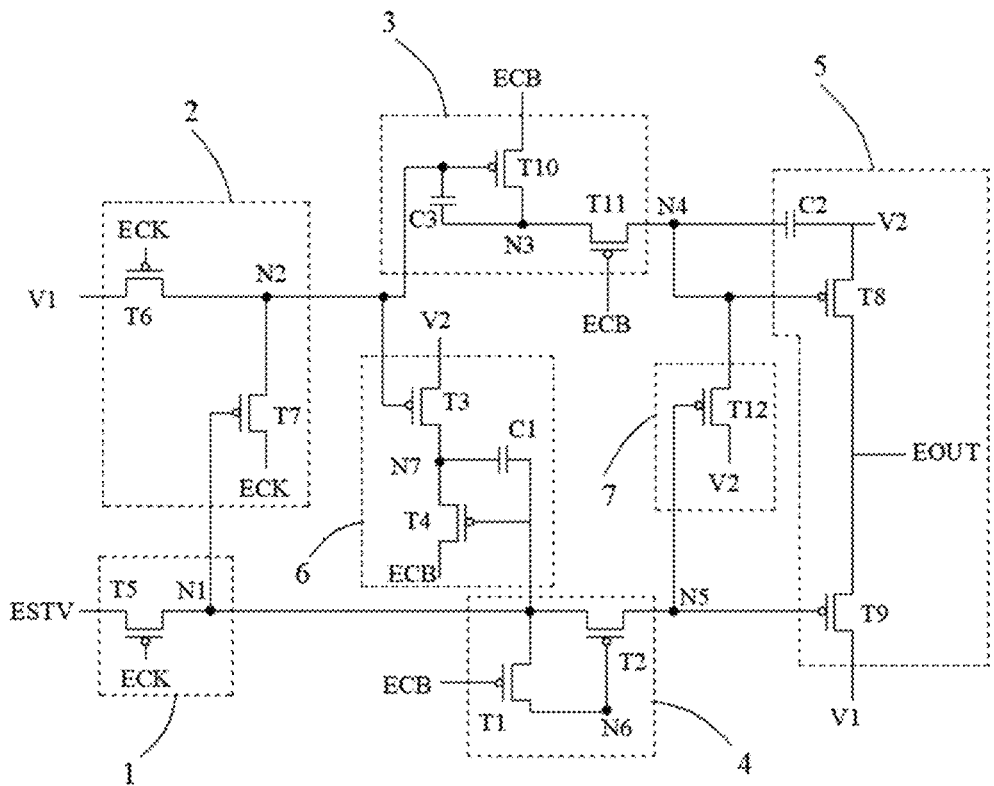
FIG. 3(a), FIG. 3(b), FIG. 3(c), and FIG. 3(d) are circuit diagrams of a shift register unit according to an embodiment of the present disclosure.

The input subcircuit 1 is connected to the signal input terminal ESTV, the first clock signal terminal ECK and the first node N1, and is configured to control connection between the signal input terminal ESTV and the first node N1 under the control of the potential of the first clock signal terminal ECK. For example, as shown in FIG. 3(a), the input subcircuit 1 can include a fifth transistor T5. A control electrode of the fifth transistor T5 is connected to the first clock signal terminal ECK, a first electrode of the fifth transistor T5 is connected to the signal input terminal ESTV, and a second electrode of the fifth transistor T5 is connected to the first node N1.

The first control subcircuit 2 is connected to the first power supply signal terminal V1, the first clock signal terminal ECK, the first node N1 and the second node N2, and is configured to control connection between the first clock signal terminal ECK and the second node N2 under the control of the potential of the first node N1, and is also configured to control connection between the first power supply signal terminal V1 and the second node N2 under the control of the potential of the first clock signal terminal ECK. For example, as shown in FIG. 3(a), the first control subcircuit 2 can include a sixth transistor T6 and a seventh transistor T7. A control electrode of the sixth transistor T6 is connected to the first clock signal terminal ECK, a first electrode of the sixth transistor T6 is connected to the first power supply signal terminal V1, and a second electrode of the sixth transistor T6 is connected to the second node N2. A control electrode of the seventh transistor T7 is connected to the first node N1, a first electrode of the seventh transistor T7 is connected to the first clock signal terminal ECK, and a second electrode of the seventh transistor T7 is connected to the second node N2. The first power supply signal terminal V1 can constantly output a low voltage.

The second control subcircuit 3 is connected to the second node N2, the third node N3, the fourth node N4 and the second clock signal terminal ECB, and is configured to control connection between the second clock signal terminal ECB and the third node N3 under the control of the potential of the second node N2, and is also configured to control connection between the third node N3 and the fourth node N4 under the control of the potential of the second clock signal terminal ECB. For example, as shown in FIG. 3(a), the second control subcircuit 3 can include a tenth transistor T10 and an eleventh transistor T11. A control electrode of the tenth transistor T10 is connected to the second node N2, a first electrode of the tenth transistor T10 is connected to the second clock signal terminal ECB, and a second electrode of the tenth transistor T10 is connected to the third node N3. A control electrode of the eleventh transistor T11 is connected to the second clock signal terminal ECB, a first electrode of the eleventh transistor T11 is connected to the third node N3, and a second electrode of the eleventh transistor T11 is connected to the fourth node N4. A third capacitor C3 can be connected between the second node N2 and the third node N3.

The third control subcircuit 4 is connected to the first node N1, the second clock signal terminal ECB and the fifth node N5, and is configured to control the potential of the fifth node N5 according to the potentials of the first node N1 and the second clock signal terminal ECB. Further, the third control subcircuit 4 is connected to the first node N1, the second clock signal terminal ECB, the fifth node N5 and the sixth node N6, and is configured to control connection between the first node N1 and the sixth node N6 under the control of the potential of the second clock signal terminal ECB, and is also configured to control connection between the first node N1 and the fifth node N5 under the control of the potential of the sixth node N6. For example, as shown in FIG. 3(a), the third control subcircuit 4 includes a first transistor T1 and a second transistor T2. A control electrode of the first transistor T1 is connected to the second clock signal terminal ECB, a first electrode of the first transistor T1 is connected to the first node N1, and a second electrode of the first transistor T1 is connected to the sixth node N6. A control electrode of the second transistor T2 is connected to the sixth node N6, a first electrode of the second transistor T2 is connected to the first node N1, and a second electrode of the second transistor T2 is connected to the fifth node N5.

Figure 2B:
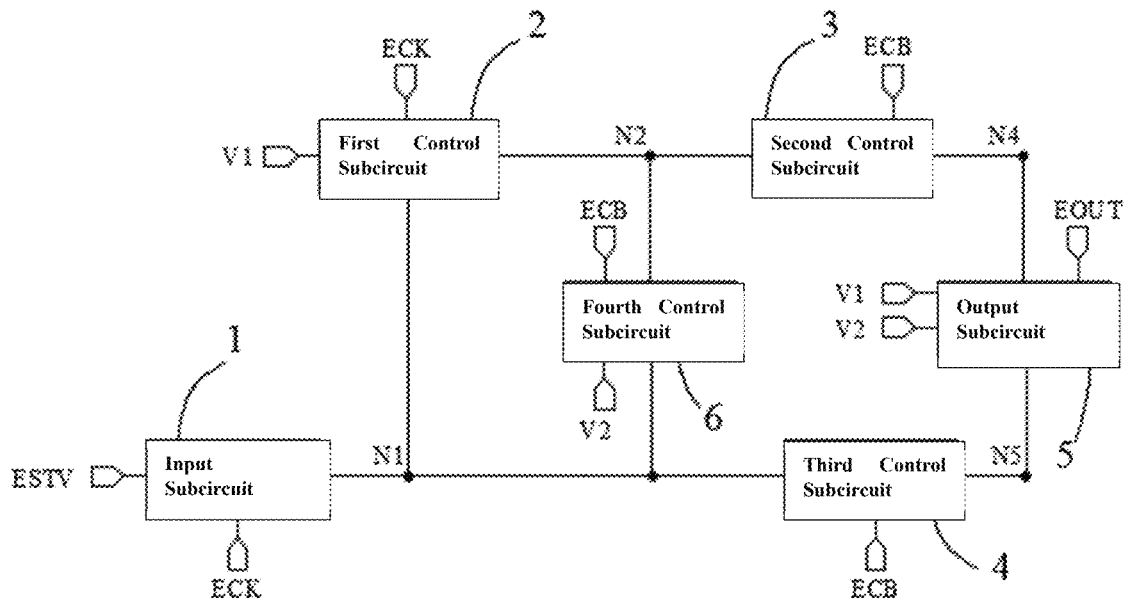
Figure 3B:
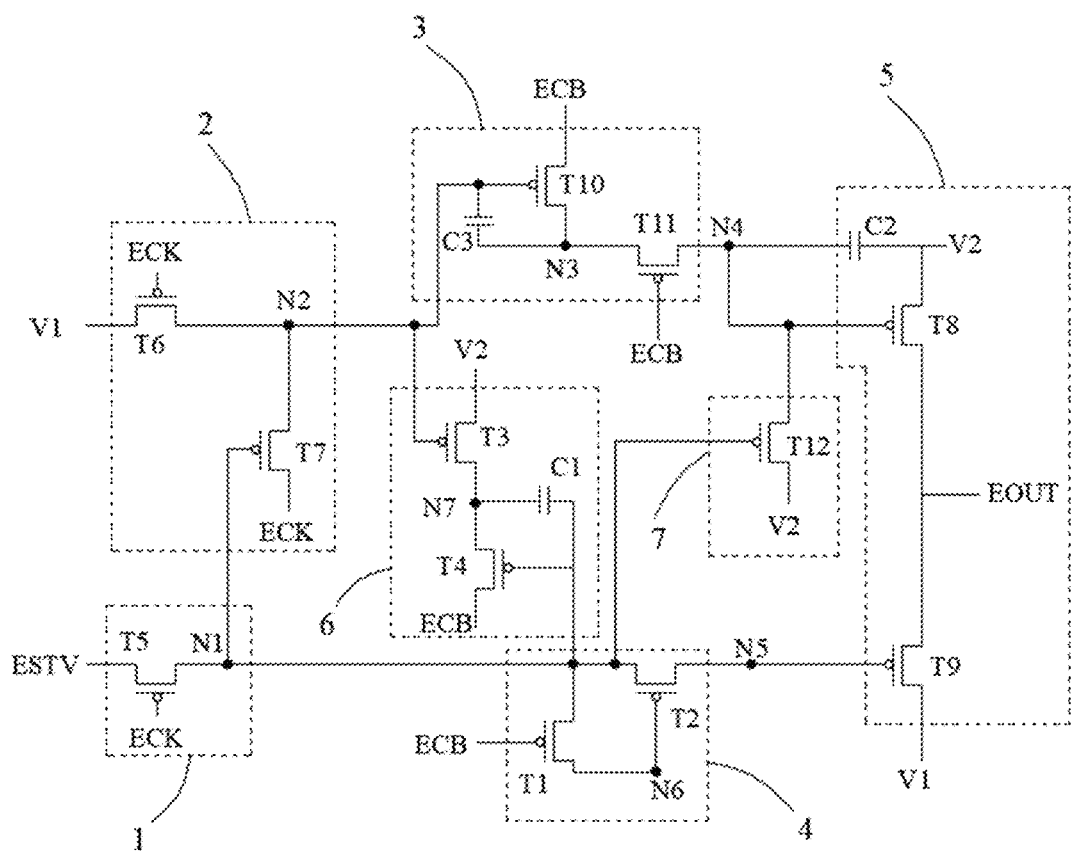

As shown in FIG. 2(b), a shift register unit of the present disclosure can also include a fourth control subcircuit 6. The fourth control subcircuit 6 can be connected to the first node N1, the second node N2, the second power supply signal terminal V2, the seventh node N7 and the second clock signal terminal ECB, and is configured to control connection between the second power supply signal terminal V2 and the seventh node N7 under the control of the potential of the second node N2, and is also configured to control connection between the seventh node N7 and second clock signal terminal ECB under the control of the potential of the first node N1. For example, as shown in FIG. 3(a), FIG. 3(b), and FIG. 3(d), the fourth control subcircuit 6 can include a third transistor T3 and a fourth transistor T4. A control electrode of the third transistor T3 is connected to the second node N2, a first electrode of the third transistor T3 is connected to the second power supply signal terminal V2, and a second electrode of the third transistor T3 is connected to the seventh node N7. A control electrode of the fourth transistor T4 is connected to the first node N1, a first electrode of the fourth transistor T4 is connected to the second clock signal terminal ECB, and a second electrode of the fourth transistor T4 is connected to the seventh node N7. The fourth control subcircuit 6 can also include a first capacitor C1. The first capacitor C1 is connected between the first node N1 and the seventh node N7. The second power supply signal terminal V2 can constantly output a high voltage.

Figure 2C:
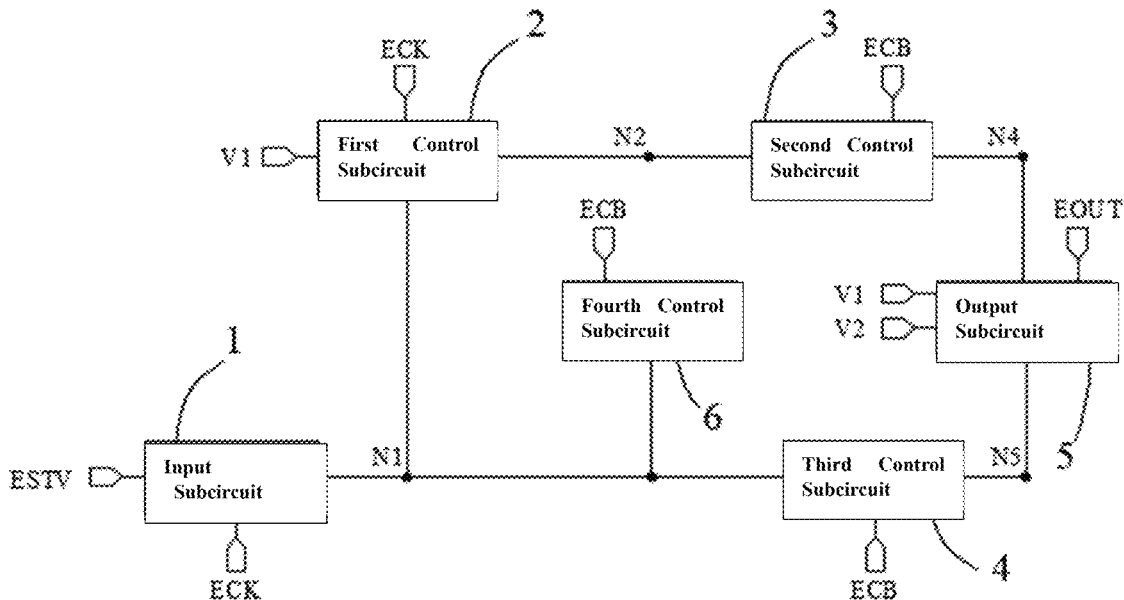
Figure 3C:
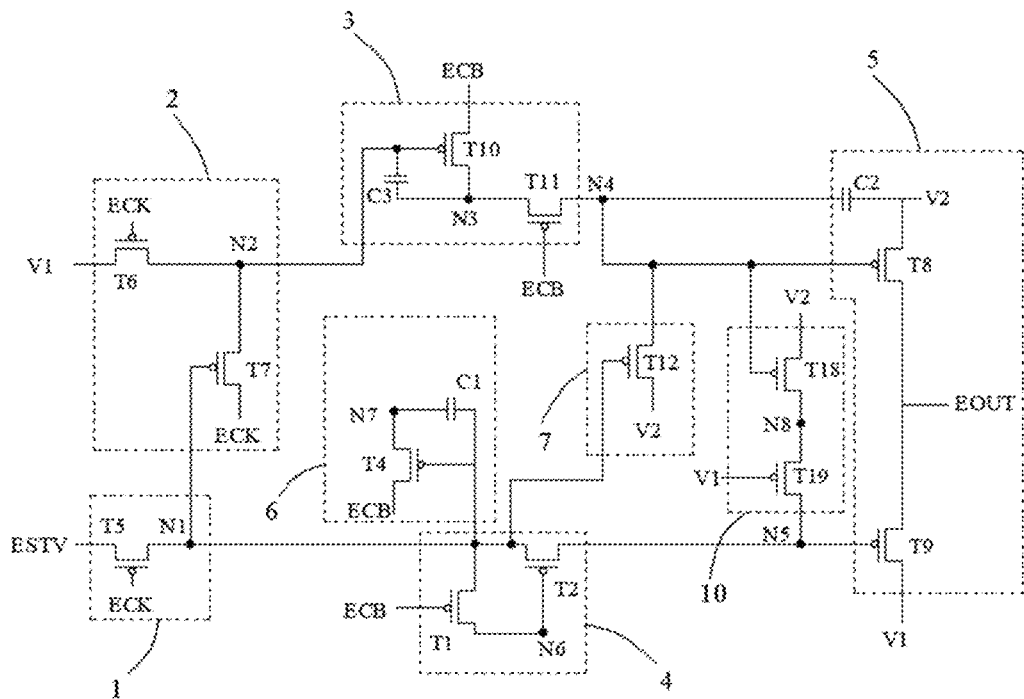
Figure 3D:
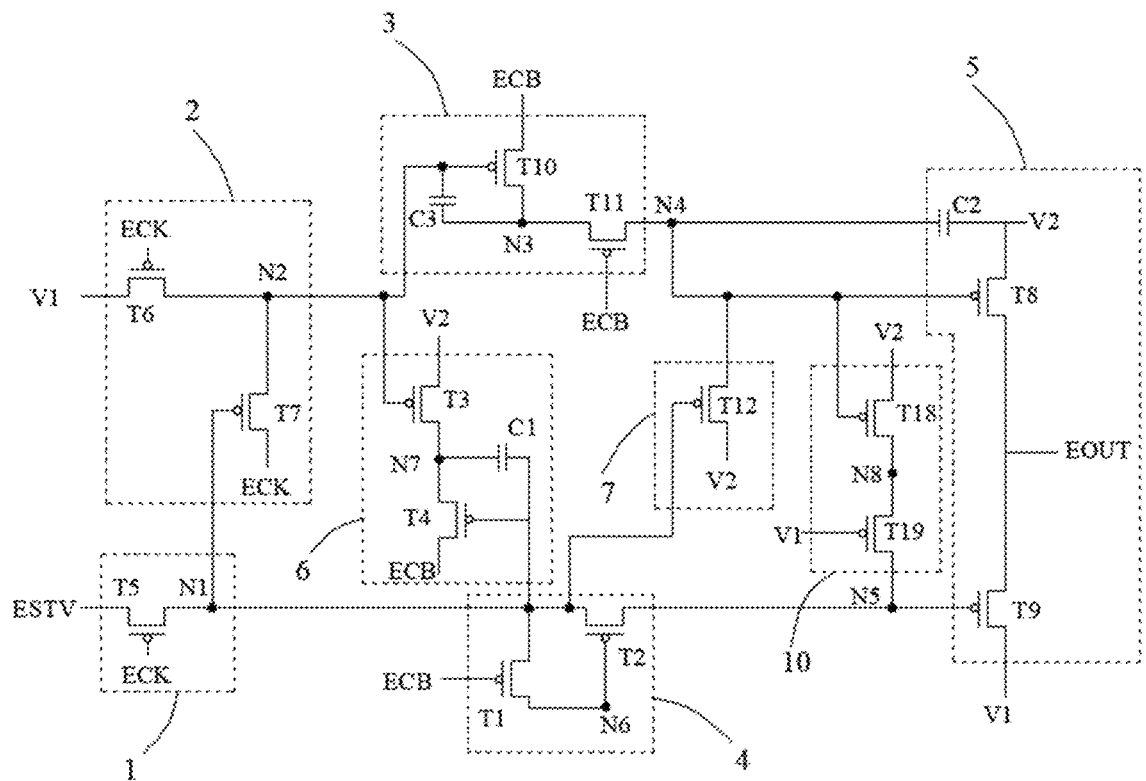

In another implementation, as shown in FIG. 2(c) and FIG. 3(c), the fourth control subcircuit 6 includes the fourth transistor T4 and the first capacitor C1. The control electrode of the fourth transistor T4 is connected to the first node N1, the first electrode of the fourth transistor T4 is connected to the second clock signal terminal ECB, and the second electrode of the fourth transistor T4 is connected to the seventh node N7; the first capacitor C1 is connected between the first node N1 and the seventh node N7. Through the fourth transistor T4 and the first capacitor C1, the present disclosure can save the potential of the first node N1, and can also lower the potential of the first node N1.

Figure 2D:
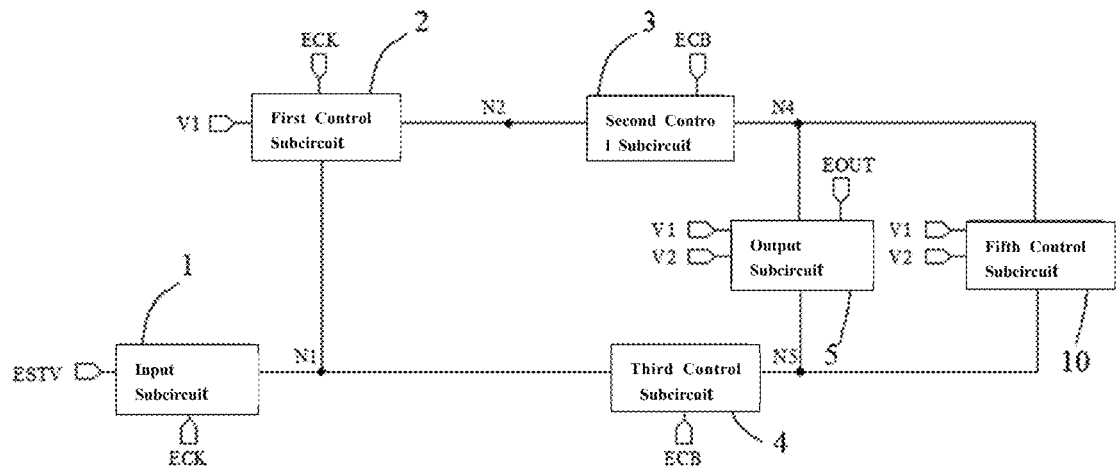

As shown in FIG. 2(d), FIG. 3(c) and FIG. 3(d), the shift register unit of the present disclosure can also include a fifth control subcircuit 10. The fifth control subcircuit 10 is connected to the fourth node N4, the fifth node N5, an eighth node N8, the first power supply signal terminal V1 and the second power supply signal terminal V2, and is configured to control connection between the fifth node N5 and the eighth node N8 under the control of the potential of the first power supply signal terminal V1, and is also configured to control connection between the second power supply signal terminal V2 and the eighth node N8 under the control of the potential of the fourth node N4. For example, the fifth control subcircuit 10 can include a sixteenth transistor T18 and a seventeenth transistor T19. A control electrode of the sixteenth transistor T18 is connected to the fourth node N4, a first electrode of the sixteenth transistor T18 is connected to the second power supply signal terminal V2, and a second electrode of the sixteenth transistor T18 is connected to the eighth node N8. A control electrode of the seventeenth transistor T19 is connected to the first power supply signal terminal V1, a first electrode of the seventeenth transistor T19 is connected to the eighth node N8, and a second electrode of the seventeenth transistor T19 is connected to the fifth node N5.

Figure 2E:
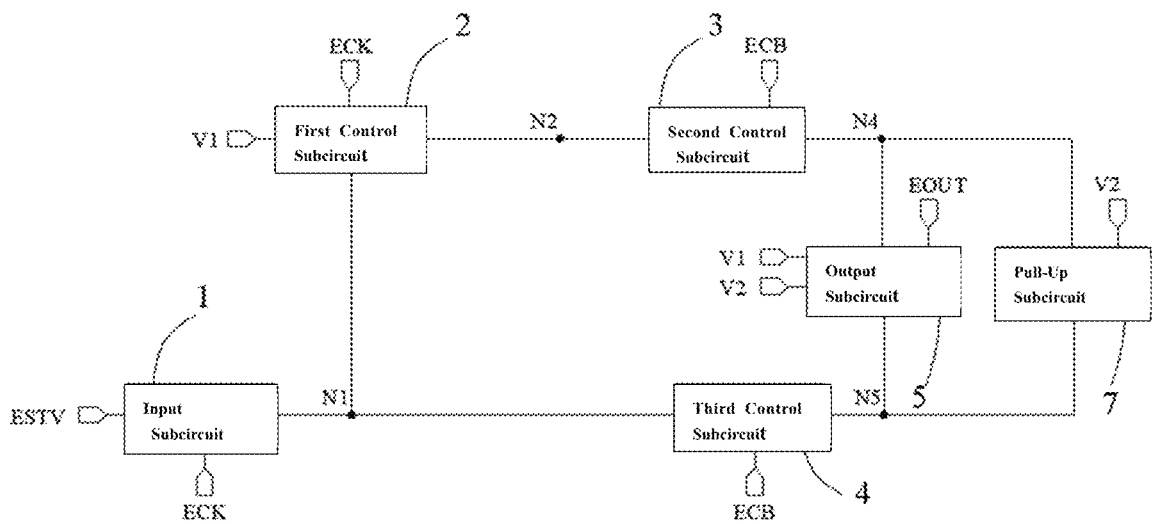
Figure 2F:
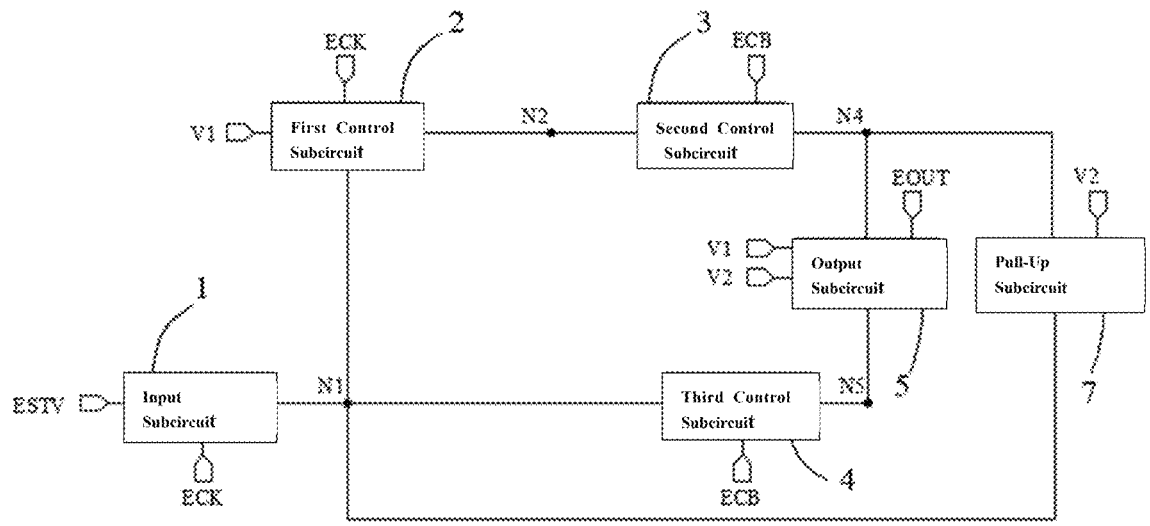

As shown in FIG. 2(e) and FIG. 2(f), the shift register unit of the present disclosure can also include a pull-up subcircuit 7. As shown in FIG. 2(e) and FIG. 3(a), the pull-up subcircuit 7 is connected to the fifth node N5, the second power supply signal terminal V2 and the fourth node N4, and is configured to control connection between the second power supply signal terminal V2 and the fourth node N4 under the control of the potential of the fifth node N5. For example, the pull-up subcircuit 7 can include a twelfth transistor T12. A control electrode of the twelfth transistor T12 is connected to the fifth node N5, a first electrode of the twelfth transistor T12 is connected to the second power supply signal terminal V2, and a second electrode of the twelfth transistor T12 is connected to the fourth node N4.

In another implementation, as shown in FIG. 2(f), FIG. 3(b) and FIG. 3(c), the pull-up subcircuit 7 is connected to the first node N1, the second power supply signal terminal V2 and the fourth node N4, and is configured to control connection between the second power supply signal terminal V2 and the fourth node N4 under the control of the potential of the first node N1. At this time, a control electrode of the twelfth transistor T12 is connected to the first node N1, a first electrode of the twelfth transistor T12 is connected to the second power supply signal terminal V2, and the second electrode of the twelfth transistor T12 is connected to the fourth node N4.

As shown in FIG. 2(a), the output subcircuit 5 is connected to the first power supply signal terminal V1, the second power supply signal terminal V2, the fourth node N4, the fifth node N5 and the signal output terminal EOUT, and is configured to control connection between the second power supply signal terminal V2 and the signal output terminal EOUT under the control of the potential of the fourth node N4, and is also configured to control connection between the first power supply signal terminal V1 and the signal output terminal EOUT under the control of the potential of the fifth node N5. For example, as shown in FIG. 3(a), the output subcircuit 5 can include an eighth transistor T8, a ninth transistor T9, and a second capacitor C2. A control electrode of the eighth transistor T8 is connected to the fourth node N4, a first electrode of the eighth transistor T8 is connected to the second power supply signal terminal V2, and a second electrode of the eighth transistor T8 is connected to the signal output terminal EOUT. A control electrode of the ninth transistor T9 is connected to the fifth node N5, a first electrode of the ninth transistor T9 is connected to the first power supply signal terminal V1, and a second electrode of the ninth transistor T9 is connected to the signal output terminal EOUT. A second capacitor C2 is connected between the fourth node N4 and the second power supply signal terminal V2. In addition, the signal output terminal EOUT can be connected to a light emission control signal terminal (EM) of a pixel circuit.

Figure 6:
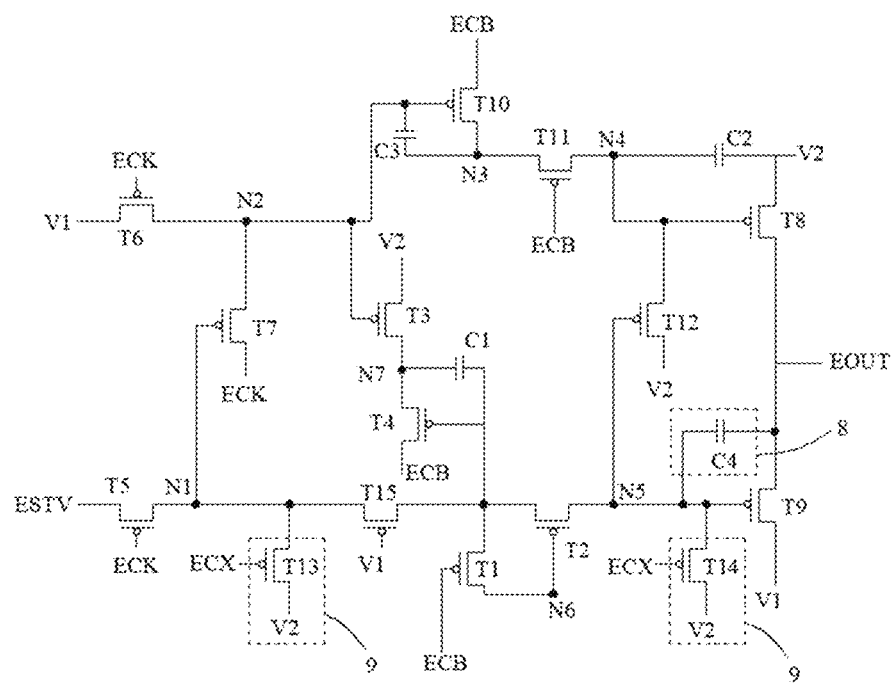
FIG. 6 is another circuit diagram of a shift register unit according to an embodiment of the present disclosure.

As shown in FIG. 6, the shift register unit of the embodiment of the present disclosure can also include a voltage stabilizing subcircuit 8. The voltage stabilizing subcircuit 8 is connected to the fifth node N5. For example, the voltage stabilizing subcircuit 8 can include a voltage stabilizing capacitor C4. The voltage stabilizing capacitor C4 can be connected between the fifth node N5 and the signal output terminal EOUT. The shift register unit of the embodiment of the present disclosure can further include a fifteenth transistor T15. A control electrode of the fifteenth transistor T15 can be connected to the first power supply signal terminal V1, a first electrode of the fifteenth transistor can be connected to the first node N1, and a second electrode of the fifteenth transistor can be connected to a control electrode of the fourth transistor T4. The fifteenth transistor T15 can be a normally-on transistor.

As shown in FIG. 6, the shift register unit of the embodiment of the present disclosure can also include an anti-flash screen subcircuit 9. The anti-flash screen subcircuit 9 is connected to the first node N1, the fifth node N5, the second power supply signal terminal V2 and the control signal terminal ECX, and is configured to control connection between the first node N1 and the second power supply signal terminal V2 under the control of the control signal terminal ECX, and is also configured to control connection between the fifth node N5 and the second power supply signal terminal V2 under the control of the control signal terminal ECX. For example, the anti-flash screen subcircuit 9 can include a thirteenth transistor T13 and a fourteenth transistor T14. The control electrode of the thirteenth transistor T13 is connected to the control signal terminal ECX, the first electrode of the thirteenth transistor is connected to the second power supply signal terminal V2, and the second electrode of the thirteenth transistor is connected to the first node N1. A control electrode of the fourteenth transistor T14 is connected to the control signal terminal ECX, a first electrode of the fourteenth transistor is connected to the second power supply signal terminal V2, and a second electrode of the fourteenth transistor is connected to the fifth node N5. When the shift register unit is powered on, the control signal terminal ECX controls the thirteenth transistor T13 and the fourteenth transistor T14 to turn on, connecting the first node N1 and the fifth node N5 to the second power supply signal terminal V2 respectively, which can prevent the power-on flash screen phenomenon occurs. When the shift register unit is operating normally, the control signal terminal ECX controls the thirteenth transistor T13 and the fourteenth transistor T14 to be disconnected to prevent the thirteenth transistor T13 and the fourteenth transistor T14 from affecting the operation of the shift register unit.

Figure 7:
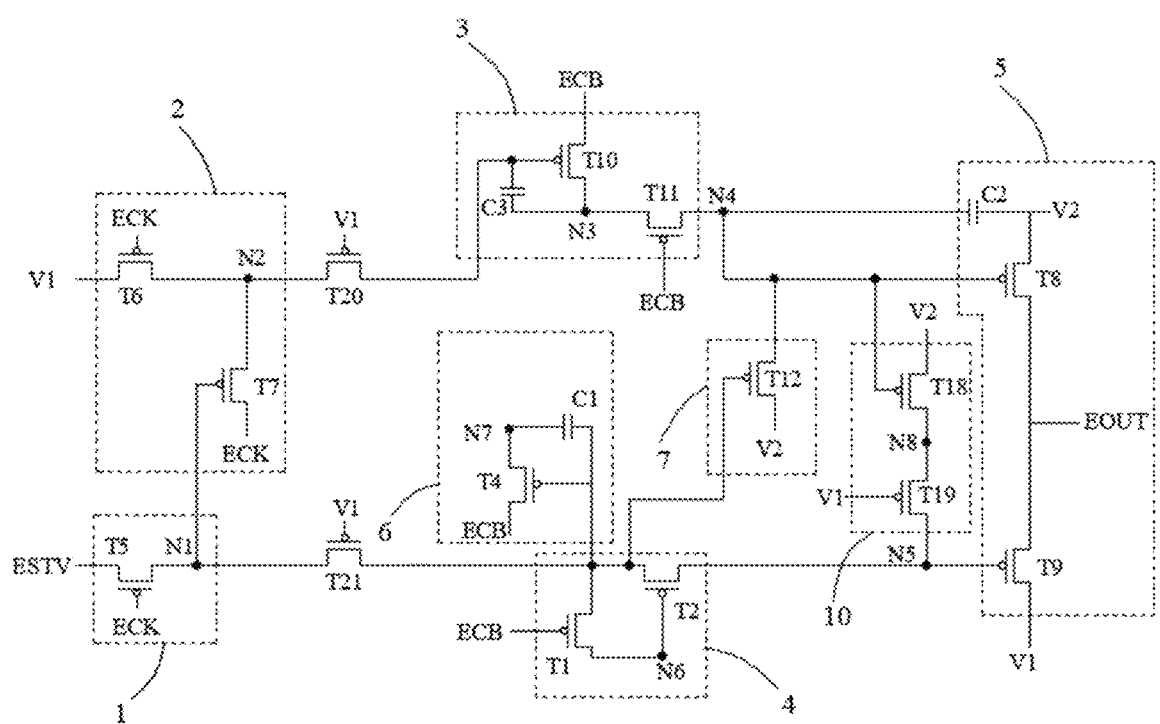
FIG. 7 is yet another circuit diagram of a shift register unit according to an embodiment of the present disclosure.

As shown in FIG. 7, the shift register unit can also include an eighteenth transistor T20 and a nineteenth transistor T21. A control electrode of the eighteenth transistor T20 is connected to the first power supply signal terminal V1, a first electrode of the eighteenth transistor T20 is connected to the second node N2, and a second electrode of the eighteenth transistor T20 is connected to a gate electrode of the tenth transistor T10. A control electrode of the nineteenth transistor T21 is connected to a first power supply signal terminal V1, a first electrode of the nineteenth transistor T21 is connected to the first node N1, and a second electrode of the nineteenth transistor T21 is connected to a gate electrode of the fourth transistor T4. The eighteenth transistor T20 and the nineteenth transistor T21 can be normally-on transistors. The provided eighteenth transistor T20 and the nineteenth transistor T21 can reduce the source-drain voltage of the fifth transistor T5, the sixth transistor T6, and the seventh transistor T7 and reduce the load.

The operation process of the shift register unit in FIG. 3(a) will be explained in detail below in conjunction with the operation timing diagram of the shift register unit shown in FIG. 4. Taking all the above transistors as P-type thin film transistors as an example, the conduction level of every transistor is at a low level.

Figure 4:
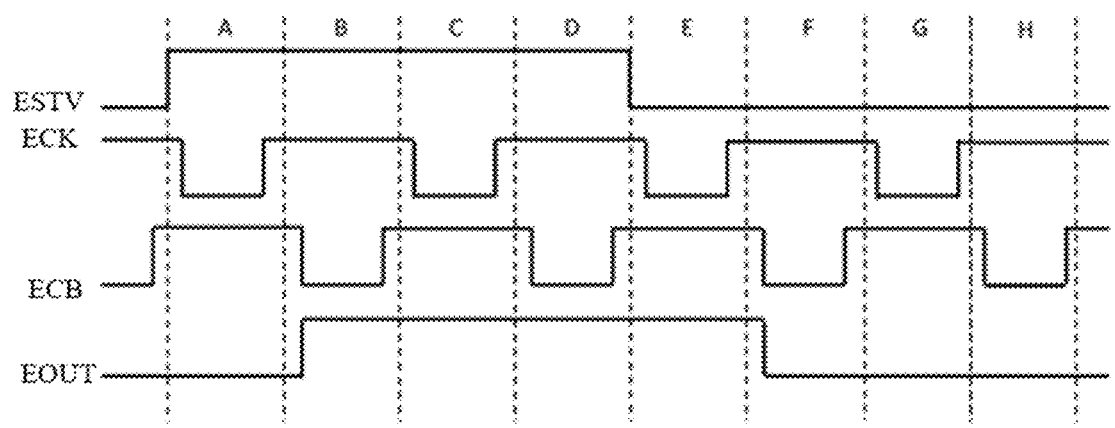
FIG. 4 is an operation timing diagram of a shift register unit according to an embodiment of the present disclosure.
Figure 5A:
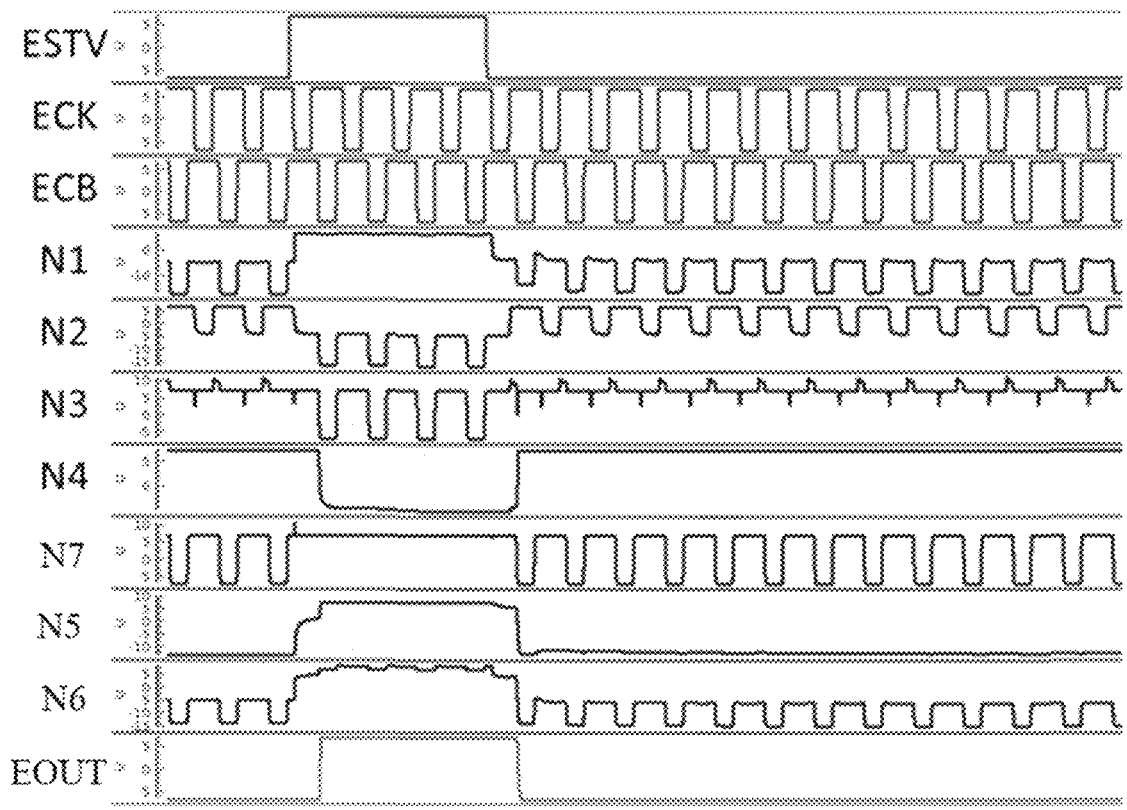
FIG. 5(a) is a schematic diagram indicating voltage at each node of the circuit shown in FIG. 3(a).

As shown in FIG. 3(a), FIG. 4 and FIG. 5(a), in phase A, the signal input terminal ESTV is at a high level, the first clock signal terminal ECK is at a low level, and the second clock signal terminal ECB is at a high level; the fifth transistor T5 is turned on, the fourth transistor T4 is turned off, VGH is written to the first node N1, the first transistor T1 is turned off, the sixth node N6 (subject to a certain coupling effect) is floating, and the second transistor T2 is partially turned on. The level of the fifth node N5 rises, the ninth transistor T9 is turned off; the seventh transistor T7 is turned off, the sixth transistor T6 is turned on, [VGL-Vth (the sixth transistor T6)] is written to the second node N2, and the third transistor T3 is turned on. VGH is written to the seventh node N7, the tenth transistor T10 is turned on, VGH is written to the third node N3, the eleventh transistor T11 is turned off, and affected by the fifth node N5, the twelfth transistor T12 is also turned off, and the fourth node N4 is floating (VGH), the eighth transistor T8 is turned off, and the signal output terminal EOUT outputs floating (VGL).

In phase B, the signal input terminal ESTV is at a high level, the first clock signal terminal ECK is at a high level, the second clock signal terminal ECB is at a low level, the fifth transistor T5 is turned off, the fourth transistor T4 is turned off, and the third transistor T3 is turned on. The first node N1 is floating, the first transistor T1 is turned on, VGH is written to the sixth node N6, the second transistor T2 is turned off, the fifth node N5 is floating, the ninth transistor T9 is turned off; the sixth transistor T6 is turned off, and the seventh transistor T7 is turned off. The tenth transistor T10 is turned on, and VGL-Vth (the sixth transistor T6)-Vth (the tenth transistor T10) is written to the third node N3. Through the coupling effect of the third capacitor C3, the level of the second node N2 is further decreased to beyond VGL, VGL is completely written to the third node N3, the eleventh transistor T11 is turned on, [VGL-Vth (the eleventh transistor T11)] is written to the fourth node N4, the eighth transistor T8 is turned on, the ninth transistor T9 is turned off, and the signal output terminal EOUT outputs VGH, and the level of the fifth node N5 is further increased to beyond VGH by the coupling effect of Cgs (the capacitance between the gate and the source or drain of the transistor) of the ninth transistor T9.

In phase C, the signal input terminal ESTV is at a high level, the first clock signal terminal ECK is at a low level, the second clock signal terminal ECB is at a high level, the fifth transistor T5 is turned on, VGH is written to the first node N1, and the fourth transistor T4 is turned off, the first transistor T1 is turned off, the sixth node N6 is floating (VGH), the fifth node N5 is floating, the ninth transistor T9 is turned off; the sixth transistor T6 is turned on, the seventh transistor T7 is turned off, and [VGL-Vth (the sixth transistor T6)] is written to the second node N2. The tenth transistor T10 is turned on, VGH is written to the third node N3, the eleventh transistor T11 is turned off, the twelfth transistor T12 is turned off, the fourth node N4 is floating [VGL-Vth (the eleventh transistor T11)], and the eighth transistor T8 is turned on, the signal output terminal EOUT outputs VGH.

In phase D, the signal input terminal ESTV is at a high level, the first clock signal terminal ECK is at a high level, and the second clock signal terminal ECB is at a low level; the fifth transistor T5 is turned off, the first node N1 is floating (VGH), and VGH is written to the sixth node N6, the second transistor T2 is turned off, the fifth node N5 is floating, and the ninth transistor T9 is turned off. The third transistor T3 is turned on, the fourth transistor T4 is turned off; the sixth transistor T6 is turned off, the seventh transistor T7 is turned off, the tenth transistor T10 is turned on, and VGL-Vth (the sixth transistor T6)-Vth (the tenth transistor T10) is written to the third node N3. Through the coupling effect of the third capacitor C3, the level of the second node N2 is further decreased to beyond VGL, VGL is completely written to the third node N3, the eleventh transistor T11 is turned on, and [VGL-Vth (the eleventh transistor T11)] is written to the fourth node N4, the eighth transistor T8 is turned on, and the signal output terminal EOUT outputs VGH.

In phase E, the signal input terminal ESTV is at a low level, the first clock signal terminal ECK is at a low level, and the second clock signal terminal ECB is at a high level; the fifth transistor T5 is turned on, and [VGL-Vth (the fifth transistors T5)] is written to the first node N1, the first transistor T1 is turned off, the sixth node N6 is floating (VGH), the second transistor T2 is turned off, the fifth node N5 is floating (VH), the ninth transistor T9 is turned off; the sixth transistor T6 is turned on, the seventh transistor T7 is turned on, [VGL-Vth (the sixth transistor T6)] is written to the second node N2, the fourth transistor T4 is turned on, the third transistor T3 is turned on, VGH is written to the seventh node N7; the tenth transistor T10 is turned on, VGH is written to the third node N3, the eleventh transistor T11 is turned off, the twelfth transistor T12 is turned off, the fourth node N4 is floating [VGL-Vth (the eleventh transistor T11)], and the eighth transistor T8 is turned on. The signal output terminal EOUT outputs VGH. Since the first transistor T1 and the second transistor T2 are provided between the ninth transistor T9 and the fifth transistor T5 in the present disclosure, the second electrode of the fifth transistor T5 is disconnected from the control electrode of the ninth transistor T9, and the potential of the first node N1 is maintained by the first capacitor C1.

In phase F, the signal input terminal ESTV is at a low level, the first clock signal terminal ECK is at a high level, and the second clock signal terminal ECB is at a low level; the fifth transistor T5 is turned off; the seventh transistor T7 is turned on, and VGH is written to the second node N2, the third transistor T3 is turned off, the fourth transistor T4 is turned on, and [VGL-Vth (the fifth transistor T5)-Vth (the fourth transistor T4)] is written to the seventh node N7. Due to the coupling effect of the first capacitor C1, the voltage of the first node N1 is further pulled down to beyond VGL, and VGL can be completely written to the seventh node N7; the first transistor T1 is turned on, and [VGL-Vth (the first transistor T1)] is written to the sixth node N6. [VGL-Vth (the first transistor T1)-Vth (the second transistor T2)] is written to the fifth node N5, the tenth transistor T10 is turned off, the third node N3 is floating (VGH), the eleventh transistor T11 and the twelfth transistor T12 both are turned on, VGH is written to the fourth node N4, the eighth transistor T8 is turned off; the ninth transistor T9 is partially turned on, and the signal output terminal EOUT outputs [VGL-Vth(the first transistor T1)-Vth(the second transistor T2)-Vth(the ninth transistor T9)]. Due to the coupling effect of Cgs of the ninth transistor T9, the level of the fifth node N5 is further pulled down to below VGL, the ninth transistor T9 can be fully turned on, the signal output terminal EOUT outputs VGL, and no step phenomenon in the related art will occur. In addition, through the coupling effect of Cgs of the second transistor T2, the level of the sixth node N6 can also be further reduced to below VGL.

In phase G, the signal input terminal ESTV is at a low level, the first clock signal terminal ECK is at a low level, and the second clock signal terminal ECB is at a high level; approximately [VGL-Vth (the fifth transistor T5)] is written to the first node N1, the first transistor T1 is turned off, and the level of the sixth node N6 is affected by the coupling effect of the Cgs of the second transistor T2 and rises above VGL; the second transistor T2 is not turned on, and the fifth node N5 is floating (VL, maintaining the low level in phase F), the ninth transistor T9 is turned on, and the signal output terminal EOUT outputs VGL; the sixth transistor T6 is turned on, the seventh transistor T7 is turned on, a low level is written to the second node N2, the third transistor T3 is turned on, and the fourth transistor T4 is turned on, VGH is written to the seventh node N7; the tenth transistor T10 is turned on, VGH is written to the third node N3, the eleventh transistor T11 is turned off, the twelfth transistor T12 is turned on, VGH is written to the fourth node N4, and the eighth transistor T8 is turned off.

In phase H, the signal input terminal ESTV is at a low level, the first clock signal terminal ECK is at a high level, and the second clock signal terminal ECB is at a low level; the fifth transistor T5 is turned off; the seventh transistor T7 is turned on, and VGH is written to the second node N2, the third transistor T3 is turned off, the fourth transistor T4 is turned on, (VGL-Vth) is written to the seventh node N7. Due to the coupling effect of the capacitor of C1, the voltage of the first node N1 is further pulled down to beyond VGL, and VGL can be completely written to the seventh node N7; the first transistor T1 is turned off, the sixth node N6 is affected by the coupling effect of Cgs of the second transistor T2 and is lowered to below VGL, the second transistor T2 is not turned on, and the fifth node N5 is floating (VL, maintaining the low level in phase G), the ninth transistor T9 is turned on and outputs VGL; the tenth transistor T10 is turned off, the third node N3 is floating (VGH), the eleventh transistor T11 and the twelfth transistor T12 are both turned on, and VGH is written to the fourth node N4, the eighth transistor T8 is turned off; the signal output terminal EOUT outputs VGL.

It can be seen that during the process of continuously outputting low level (effective level), the fifth node N5 is always in the floating state, and the ninth transistor T9 remains in the turned-on state to avoid the output signal of the signal output terminal EOUT from being disturbed. It is noted that if the fifth node N5 is disturbed and becomes high level while the output continues to be low. Firstly, the fourth node N4 maintains VGH and the output signal floating is still VGL. Secondly, in the next phase H, the potentials of the first node N1 and the sixth node N6 are both lower than VGL due to the coupling effect. Therefore, the fifth node N5 can be reset to a lower voltage than VGL.

Compared with the shift register unit shown in FIG. 3(*a*), the difference in the operation process of the shift register unit shown in FIG. 3(*b*) is that: in phase E, the twelfth transistor T12 is turned on, VGH is written to the fourth node N4, and the eighth transistor T8 is turned off.

The operation process of the shift register unit in FIG. 3(*c*) will be explained in detail below in conjunction with the operation timing diagram of the shift register unit shown in FIG. 4. Taking all the above transistors as P-type thin film transistors as an example, the conduction level of every transistor is at a low level.

Figure 5B:
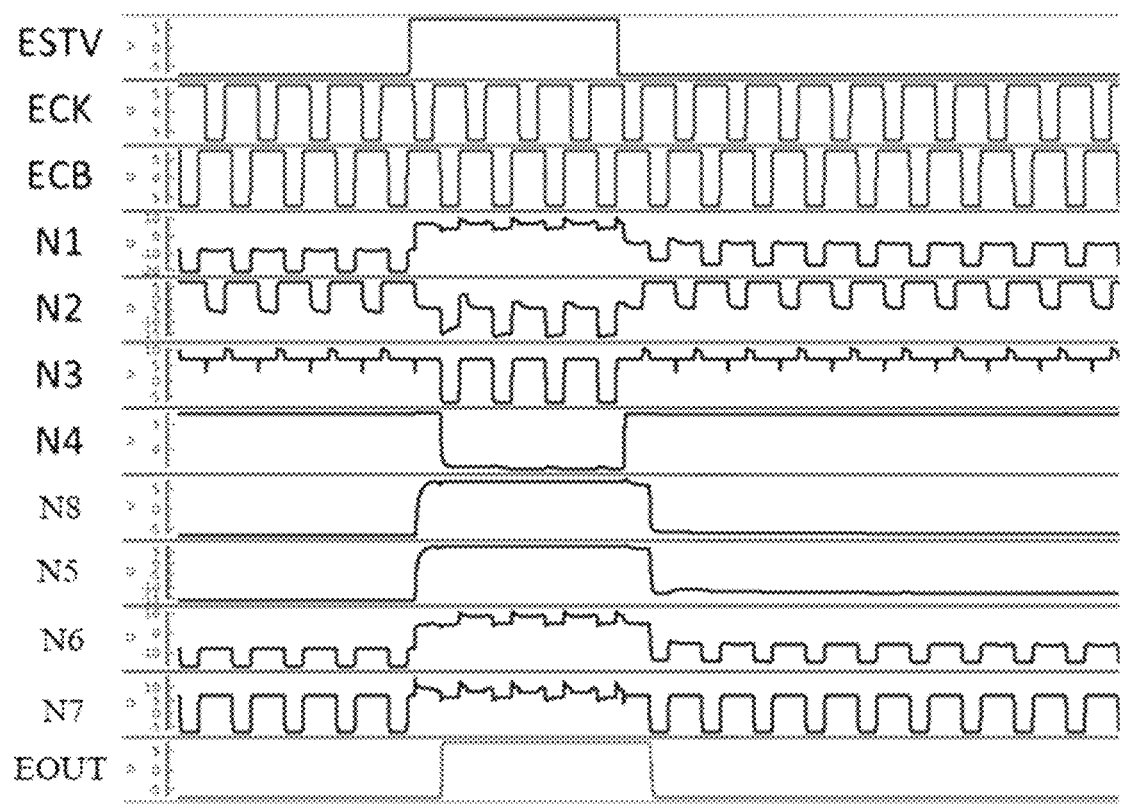
FIG. 5(b) is a schematic diagram indicating voltage at each node of the circuit shown in FIG. 3(c).

As shown in FIG. 3(*c*), FIG. 4 and FIG. 5(*b*), in phase A, the signal input terminal ESTV is at a high level, the first clock signal terminal ECK is at a low level, and the second clock signal terminal ECB is at a high level. The fifth transistor T5 is turned on, and VGH is written to the first node N1; the fourth transistor T4 is turned off, and the seventh node N7 (subject to a certain coupling effect) is floating; the first transistor T1 is turned off, and the sixth node N6 (subject to a certain coupling effect) is floating. The second transistor T2 is partially turned on, the level of the fifth node N5 rises, the ninth transistor T9 is turned off; the seventh transistor T7 is turned off, the sixth transistor T6 is turned on, and [VGL-Vth (the sixth transistor T6)] is written to the second node N2, the tenth transistor T10 is turned on, VGH is written to the third node N3, the eleventh transistor T11 is turned off, the twelfth transistor T12 is turned off, the fourth node N4 is floating (VGH), the eighth transistor T8 is turned off, and the signal output terminal EOUT outputs floating (VGL).

In phase B, the signal input terminal ESTV is at a high level, the first clock signal terminal ECK is at a high level, the second clock signal terminal ECB is at a low level, the fifth transistor T5 is turned off, the fourth transistor T4 is turned off, and the first node N1 is floating. The seventh node N7 is floating; the first transistor T1 is turned on, VGH is written to the sixth node N6, the second transistor T2 is turned off; the sixth transistor T6 is turned off, the seventh transistor T7 is turned off, the second node N2 is floating, and the tenth transistor T10 is turned on. VGL-Vth (the sixth transistor T6)-Vth (the tenth transistor T10) is written to the third node N3. Through the coupling effect of the third capacitor C3, the level of the second node N2 is further decreased to beyond VGL, and VGL is completely written to the third node N3; the eleventh transistor T11 is turned on, and [VGL-Vth (eleventh transistor T11)] is written to the fourth node N4; the sixteenth transistor T18 is turned on, the seventeenth transistor T19 is turned on, and VGH is written to the fifth node N5; the ninth transistor T9 is turned off, the eighth transistor T8 is turned on, and the signal output terminal EOUT outputs VGH. It can be seen that under the action of the sixteenth transistor T18 and the seventeenth transistor T19, VGH is written to the fifth node N5 to prevent it from being in a floating state and will not be affected by the coupling effect of Cgs (capacitance between gate and source or drain of the transistor) of the ninth transistor T9.

In phase C, the signal input terminal ESTV is at a high level, the first clock signal terminal ECK is at a low level, the second clock signal terminal ECB is at a high level, the fifth transistor T5 is turned on, VGH is written to the first node N1, and the fourth transistor T4 is turned off, the first transistor T1 is turned off, the sixth node N6 is floating (VGH); the sixth transistor T6 is turned on, the seventh transistor T7 is turned off, and [VGL-Vth (the sixth transistor T6)] is written to the second node N2. The tenth transistor T10 is turned on, VGH is written to the third node N3, the eleventh transistor T11 is turned off, the twelfth transistor T12 is turned off, the fourth node N4 is floating [VGL-Vth (the eleventh transistor T11)], and the eighth transistor T8 is turned on; the sixteenth transistor T18 is turned on, the seventeenth transistor T19 is turned on, VGH is written to the fifth node N5, the ninth transistor T9 is turned off, and the signal output terminal EOUT outputs VGH.

In phase D, the signal input terminal ESTV is at a high level, the first clock signal terminal ECK is at a high level, and the second clock signal terminal ECB is at a low level; the fifth transistor T5 is turned off, the first node N1 is floating (VGH), and VGH is written to the sixth node N6, the second transistor T2 is turned off; the sixth transistor T6 is turned off, the seventh transistor T7 is turned off, the tenth transistor T10 is turned on, and VGL-Vth(the sixth transistor T6)-Vth(the tenth transistor T10) is written to the third node N3, through the coupling effect of the third capacitor C3, the level of the second node N2 is further decreased to beyond VGL, VGL is completely written to the third node N3, the eleventh transistor T11 is turned on, and [VGL-Vth (the eleventh transistor T11)] is written to the fourth node N4, the eighth transistor T8 is turned on; the sixteenth transistor T18 is turned on, the seventeenth transistor T19 is turned on, VGH is written to the fifth node N5, the ninth transistor T9 is turned off, and the signal output terminal EOUT outputs VGH.

In phase E, the signal input terminal ESTV is at a low level, the first clock signal terminal ECK is at a low level, and the second clock signal terminal ECB is at a high level; the fifth transistor T5 is turned on, and [VGL-Vth (the fifth transistors T5)] is written to the first node N1; the fourth transistor T4 is turned on, and VGH is written to the seventh node N7; the first transistor T1 is turned off, the sixth node N6 is floating (VGH), and the second transistor T2 is turned off; the sixth transistor T6 is turned on, and the seventh transistor T7 is turned on, [VGL-Vth (the sixth transistor T6)] is written to the second node N2; the tenth transistor T10 is turned on, VGH is written to the third node N3, the eleventh transistor T11 is turned off, the twelfth transistor T12 is turned on. VGH is written to the fourth node N4, the eighth transistor T8 is turned off; the sixteenth transistor T18 is turned off, the seventeenth transistor T19 is turned on, the fifth node N5 is floating (VGH), the ninth transistor T9 is turned off, and the signal output terminal EOUT outputs floating (VGH). The potential of the first node N1 of the present disclosure can be maintained by the first capacitor C1.

In phase F, the signal input terminal ESTV is at a low level, the first clock signal terminal ECK is at a high level, and the second clock signal terminal ECB is at a low level; the fifth transistor T5 is turned off, the fourth transistor T4 is turned on, and [VGL-Vth (the fifth transistor T5)-Vth (the fourth transistor T4)] is written to the seventh node N7. Due to the coupling effect of the first capacitor C1, the voltage of the first node N1 is further pulled down to beyond VGL, and VGL can be completely written to the seventh node N7; the first transistor T1 is turned on, [VGL-Vth (the first transistor T1)] is written to the sixth node N6, and [VGL-Vth (the first transistor T1)-Vth (the second transistor T2)] is written to the fifth node N5. The seventh transistor T7 is turned on, VGH is written to the second node N2, and the tenth transistor T10 is turned off; the twelfth transistor T12 is turned on, VGH is written to the fourth node N4, the eleventh transistor T11 is turned on, and VGH is written to the third node N3; the eighth transistor T8 and the sixteenth transistor T18 are both turned off; the ninth transistor T9 is partially turned on, and the signal output terminal EOUT outputs [VGL-Vth (the first transistor T1)-Vth (the second transistor T2)-Vth (the ninth transistor T9)]. Due to the coupling effect of Cgs of the ninth transistor T9, the fifth node N5 is further pulled down to below VGL, the ninth transistor T9 can be fully turned on, and the signal output terminal EOUT outputs VGL, and no step phenomenon in the related art will occur. In addition, through the coupling effect of Cgs of the second transistor T2, the sixth node N6 can also be further reduced to below VGL.

In phase G, the signal input terminal ESTV is at a low level, the first clock signal terminal ECK is at a low level, and the second clock signal terminal ECB is at a high level; the first node N1 is coupled to approximately VGL by the fourth transistor T4 and the first capacitor C1, VGH is written to the seventh node N7, the first transistor T1 is turned off, the sixth node N6 is affected by the coupling effect of Cgs of the second transistor T2 and rises above VGL; the sixth transistor T6 is turned on, the seventh transistor T7 is turned on. A low level is written to the second node N2, the tenth transistor T10 is turned on, VGH is written to the third node N3, the eleventh transistor T11 is turned off, the twelfth transistor T12 is turned on, VGH is written to the fourth node N4, and the eighth transistor T8 is turned off. The second transistor T2 is not turned on, the fifth node N5 is floating (VL, maintaining the low level of phase F), the ninth transistor T9 is turned on, and the signal output terminal EOUT outputs VGL.

In phase H, the signal input terminal ESTV is at a low level, the first clock signal terminal ECK is at a high level, and the second clock signal terminal ECB is at a low level; the fifth transistor T5 is turned off; the seventh transistor T7 is turned on, and VGH is written to the second node N2, the tenth transistor T10 is turned off, the twelfth transistor T12 is turned on, VGH is written to the fourth node N4, the eighth transistor T8 and the sixteenth transistor T16 are turned off, the eleventh transistor T11 is turned on, and VGH is written to the third node N3. The fourth transistor T4 is turned on, and (VGL-Vth) is written to the seventh node N7. Due to the coupling effect of the capacitor of C1, the voltage of the first node N1 is further lowered than VGL, and VGL can be completely written to the seventh node N7. The sixth node N6 is affected by the coupling effect of Cgs of the second transistor T2 and drops below VGL. Since the source voltage and drain voltage of the first transistor T1 are both lower than the gate voltage, the first transistor T1 is not turned on. Similarly, the second transistor T2 is not turned on, the fifth node N5 is floating (VL, maintaining the low level in phase G), the ninth transistor T9 is turned on, and the signal output terminal EOUT outputs VGL.

It can be seen that in the process of continuously outputting low level (effective level) in the circuit with the structure shown in FIG. 3(c), the fifth node N5 is always in a floating state. It is noted that if the fifth node N5 is disturbed and becomes high level while the output continues to be low, first of all, since the first node N1 has the first capacitor C1, the first node N1 is not easily disturbed. In phases when the output is VGL, the capacitance of the first node N1 is at a low level (in phase G is about VGL, and in phase H is at a lower level than VGL). The gate potential of the twelfth transistor T12 is in a relatively stable state. The twelfth transistor T12 continues to be turned on. The voltage of the four-node N4 can be guaranteed to be VGH and the eighth transistor T8 is turned off. Even if a signal floating output from the signal output terminal EOUT is still VGL. Secondly, when the second clock signal terminal ECB becomes low level, the fourth transistor T4 is turned on, (VGL-Vth) is written to the seventh node N7, and due to the coupling effect of the capacitor of C1, the voltage of the first node N1 is further lowered to beyond VGL, and VGL can be completely written to the seventh node N7; the sixth node N6 is affected by the coupling effect of Cgs of the second transistor T2 and reduced to lower than VGL, that is, the sixth node N6 is reset to a lower voltage than VGL, the second transistor T2 is turned on again, the first node N1 is conducted to the fifth node N5, and the fifth node N5 is reset to a lower voltage than VGL.

Compared with the shift register unit shown in FIG. 3(c), the difference in the operation process of the shift register unit shown in FIG. 3(d) is that: in phase A, the third transistor T3 is turned on, and VGH is written to the seventh node N7. in phase B, phase C, phase D and phase E, the third transistor T3 remains on, and the seventh node N7 maintains VGH; in phase F, the third transistor T3 is turned off; in phase G, the third transistor T3 is turned on; in phase H, the third transistor T3 is turned off.

An embodiment of the present disclosure also provides a gate driving circuit. The gate driving circuit can include a plurality of cascaded shift register units of any of the above implements.

An embodiment of the present disclosure also provides a display device. The display device can include the gate driving circuit of the above-described embodiment.

An embodiment of the present disclosure also provides a driving method of a shift register unit. This driving method uses the shift register unit of the above embodiment. The driving method can include: causing the input subcircuit 1 to control connection between the signal input terminal ESTV and the first node N1 under the control of the potential of the first clock signal terminal ECK; causing the first control subcircuit 2 to control connection between the first clock signal terminal ECK and the second node N2 under the control of the potential of the first node N1, and causing the first control subcircuit 2 to control connection between the first power supply signal terminal V1 and the second node N2 under the control of the potential of the first clock signal terminal ECK; causing the second control subcircuit 3 to control connection between the second clock signal terminal ECB and the third node N3 under the control of the potential of the second node N2, and also causing the second control subcircuit 3 to control connection between the third node N3 and the fourth node N4 under the control of the potential of the second clock signal terminal ECB; causing the third control subcircuit 4 to control the potential of the fifth node N5 according to the potential of the first node N1 and the potential of the second clock signal terminal ECB; causing the output subcircuit 5 to control connection between the second power supply signal terminal V2 and the signal output terminal EOUT under the control of the potential of the fourth node N4, and causing the output subcircuit 5 to control connection between the first power supply signal terminal V1 and the signal output terminal EOUT under the control of the potential of the fifth node N5.

The display device, the gate driving circuit, the shift register unit and the driving method provided by the embodiments of the present disclosure belong to the same inventive concept. The relevant details and descriptions of beneficial effects can be referred to each other and will not be repeated herein.

The above are only preferred embodiments of the present disclosure, and do not limit the present disclosure in any form. Although the present disclosure has been disclosed as above in preferred embodiments, it is not used to limit the present disclosure. Anyone skilled in the art, without departing from the scope of the technical solution of the present disclosure, can use the technical content disclosed above to make some changes or modifications to equivalent implementations with equivalent changes. However, any content that does not depart from the technical solution of the present disclosure, any simple modifications, equivalent changes and modifications made to the above embodiments based on the technical essence of the present disclosure still fall within the scope of the technical solution of the present disclosure.

What is claimed is:

1. A shift register unit, comprising:
   an input subcircuit connected to a signal input terminal, a first clock signal terminal and a first node, and configured to control connection between the signal input terminal and the first node under control of a potential of the first clock signal terminal;
   a first control subcircuit connected to a first power supply signal terminal, the first clock signal terminal, the first node and a second node, configured to control connection between the first clock signal terminal and the second node under control of a potential of the first node, and further configured to control connection between the first power supply signal terminal and the second node under control of a potential of the first clock signal terminal;
   a second control subcircuits connected to the second node, a third node, a fourth node and a second clock signal terminal, configured to control connection between the second clock signal terminal and the third node under control of a potential of the second node, and further configured to control connection between the third node and the fourth node under control of a potential of the second clock signal terminal;
   a third control subcircuit connected to the first node, the second clock signal terminal and a fifth node, and configured to control a potential of the fifth node according to potentials of the first node and the second clock signal terminal; wherein the third control subcircuit is connected to the first node, the second clock signal terminal, the fifth node and the sixth node, configured to control connection between the first node and the sixth node under control of a potential of the second clock signal terminal, and further configured to control connection between the first node and the fifth node under control of a potential of the sixth node;

an output subcircuit connected to the first power supply signal terminal, a second power supply signal terminal, the fourth node, the fifth node and a signal output terminal, configured to control connection between the second power supply signal terminal and the signal output terminal under control of a potential of the fourth node, and further configured to control connection between the first power supply signal terminal and the signal output terminal under control of a potential of the fifth node.

2. The shift register unit according to claim 1, wherein the third control subcircuit comprises:

a first transistor having a control electrode connected to the second clock signal terminal, a first electrode connected to the first node, and a second electrode connected to the sixth node;

a second transistor having a control electrode connected to the sixth node, a first electrode connected to the first node, and a second electrode connected to the fifth node.

3. The shift register unit according to claim 1, further comprising a fourth control subcircuit; wherein the fourth control subcircuit comprises a third transistor, a fourth transistor and a first capacitor, the third transistor has a control electrode connected to the second node, a first electrode connected to the second power supply signal terminal, and a second electrode connected to the seventh node; the fourth transistor has a control electrode connected to the first node, a first electrode connected to the second clock signal terminal, and a second electrode connected to the seventh node; the first capacitor is connected between the first node and the seventh node.

4. The shift register unit according to claim 1, further comprising a fourth control subcircuit; wherein the fourth control subcircuit comprises a fourth transistor and a first capacitor, the fourth transistor has a control electrode connected to the first node, a first electrode connected to the second clock signal terminal, and a second electrode connected to the seventh node; the first capacitor is connected between the first node and the seventh node.

5. The shift register unit according to claim 1, further comprising:

a fifth control subcircuit connected to the fourth node, the fifth node, an eighth node, the first power supply signal terminal and the second power supply signal terminal, and configured to control connection between the fifth node and the eighth node under control of a potential of the first power supply signal terminal, and further configured to control connection between the second power supply signal terminal and the eighth node under control of a potential of the fourth node.

6. The shift register unit according to claim 5, wherein the fifth control subcircuit comprises:

a sixteenth transistor having a control electrode connected to the fourth node, a first electrode connected to the second power supply signal terminal, and a second electrode connected to the eighth node;

a seventeenth transistor having a control electrode connected to the first power supply signal terminal, a first electrode connected to the eighth node, and a second electrode connected to the fifth node.

7. The shift register unit according to claim 5, further comprising:

a pull-up subcircuit connected to the first node, the second power supply signal terminal and the fourth node, and configured to control connection between the second power supply signal terminal and the fourth node under control of a potential of the first node.

8. The shift register unit according to claim 1, wherein the input subcircuit comprises:

a fifth transistor having a control electrode connected to the first clock signal terminal, a first electrode connected to the signal input terminal, and a second electrode connected to the first node.

9. The shift register unit according to claim 8, wherein the first control subcircuit comprises:

a sixth transistor having a control electrode connected to the first clock signal terminal, a first electrode connected to the first power supply signal terminal, and a second electrode connected to the second node;

a seventh transistor having a control electrode connected to the first node, a first electrode connected to the first clock signal terminal, and a second electrode connected to the second node.

10. The shift register unit according to claim 9, wherein the output subcircuit comprises:

an eighth transistor having a control electrode connected to the fourth node, a first electrode connected to the second power supply signal terminal, and a second electrode connected to the signal output terminal;

a ninth transistor having a control electrode connected to the fifth node, a first electrode connected to the first power supply signal terminal, and a second electrode connected to the signal output terminal;

a second capacitor connected between the fourth node and the second power supply signal terminal.

11. The shift register unit according to claim 10, wherein the second control subcircuit comprises:

a tenth transistor having a control electrode connected to the second node, a first electrode connected to the second clock signal terminal, and a second electrode connected to the third node;

an eleventh transistor having a control electrode connected to the second clock signal terminal, a first electrode connected to the third node, and a second electrode connected to the fourth node;

a third capacitor connected between the second node and the third node.

12. The shift register unit according to claim 1, further comprising:

a pull-up subcircuit connected to the fifth node, the second power supply signal terminal and the fourth node, and configured to control connection between the second power supply signal terminal and the fourth node under control of a potential of the fifth node; or the pull-up subcircuit being connected to the first node, the second power supply signal terminal and the fourth node, and configured to control connection between the second power supply signal terminal and the fourth node under control of a potential of the first node.

13. The shift register unit according to claim 1, further comprising:

a voltage stabilizing subcircuit connected to the fifth node.

14. The shift register unit according to claim 13, wherein the voltage stabilizing subcircuit comprises:

a voltage stabilizing capacitor connected between the fifth node and the signal output terminal.

15. The shift register unit according to claim 1, further comprising:
- an anti-flash screen subcircuit, connected to the first node, the fifth node, the second power supply signal terminal and the control signal terminal, configured to control connection between the first node and the second power supply signal terminal under control of a potential of the control signal terminal, and further configured to control connection between the fifth node and the second power supply signal terminal under control of a potential of the control signal terminal.

16. A gate driving circuit, comprising a plurality of cascaded shift register units according to claim 1.

17. A display device, comprising the gate driving circuit according to claim 16.

18. A driving method for a shift register unit, wherein the driving method is applied to the shift register unit according to claim 1, and the driving method comprises:
- causing the input subcircuit to control connection between the signal input terminal and the first node under control of a potential of the first clock signal terminal;
- causing the first control subcircuit to control connection between the first clock signal terminal and the second node under control of a potential of the first node, and further causing the first control subcircuit to control connection between the first power supply signal terminal and the second node under control of a potential of the first clock signal terminal;
- causing the second control subcircuit to control connection between the second clock signal terminal and the third node under control of a potential of the second node, and further causing the second control subcircuit to control connection between the third node and the fourth node under control of a potential of the second clock signal terminal;
- causing the third control subcircuit to control a potential of the fifth node according to potentials of the first node and the second clock signal terminal; wherein the third control subcircuit is connected to the first node, the second clock signal terminal, the fifth node and the sixth node, configured to control connection between the first node and the sixth node under control of a potential of the second clock signal terminal, and further configured to control connection between the first node and the fifth node under control of a potential of the sixth node;
- causing the output subcircuit to control connection between the second power supply signal terminal and the signal output terminal under control of a potential of the fourth node, and further causing the output subcircuit to control connection between the first power supply signal terminal and the signal output terminal under control of a potential of the fifth node.

* * * * *